United States Patent [19]

Leonardi

[11] Patent Number: 5,033,837
[45] Date of Patent: Jul. 23, 1991

[54] EYEGLASS FRAMES WITH REINFORCING TUBES

[75] Inventor: Peter Leonardi, Gloversville, N.Y.

[73] Assignee: Halo Optical Products, Inc., Gloversville, N.Y.

[21] Appl. No.: 590,039

[22] Filed: Sep. 28, 1990

Related U.S. Application Data

[63] Continuation of Ser. No. 324,453, Mar. 16, 1989, abandoned.

[51] Int. Cl.$^5$ .......................... G02C 5/14; G02C 5/22
[52] U.S. Cl. .................................... 351/121; 351/111; 351/153
[58] Field of Search ............... 351/111, 121, 153, 158; 16/228

[56] References Cited

U.S. PATENT DOCUMENTS

| | | | |
|---|---|---|---|
| 3,021,753 | 2/1962 | Vinson | 351/52 |
| 3,762,805 | 10/1973 | Lyons, Sr. | 351/113 |
| 3,846,017 | 11/1974 | Ferrell | 351/106 |
| 4,222,640 | 9/1980 | Bononi | 351/83 |
| 4,331,394 | 5/1982 | Girard | 351/111 X |
| 4,408,843 | 10/1983 | Bononi | 351/153 |
| 4,564,272 | 1/1986 | Rinnooy Kan | 351/153 |
| 4,662,729 | 5/1987 | Dobson | 351/123 |

FOREIGN PATENT DOCUMENTS 2087094 5/1982 United Kingdom .

*Primary Examiner*—Rodney B. Bovernick
*Attorney, Agent, or Firm*—Roylance, Abrams, Berdo & Goodman

[57] ABSTRACT

A reinforced eyeglass frame assembly having a frame front and temple members, a pair of hinge members pivotally coupling the temple members to the frame front between open and closed positions, and a pair of reinforcing tubes slidably coupled to the temple members. When the temple members are in their closed positions, the reinforcing tubes are located in their first positions spaced from the hinge members allowing for free pivotal movement of the temple members. When the temple members are pivoted to their open positions, the reinforcing tubes are moved to their second positions surrounding the hinge members and locking them against pivotal movement. The tubes and hinge members are sized so that the tubes frictionally engage a part of the frame front and the hinge members, when in their second positions, to retain the tubes over the hinge members. The reinforcing tubes are preferably formed of a polymeric material, such as polycarbonate, that is stronger and stiffer than the polymeric material forming the frame front and temple members, such as cellulose acetate.

23 Claims, 2 Drawing Sheets

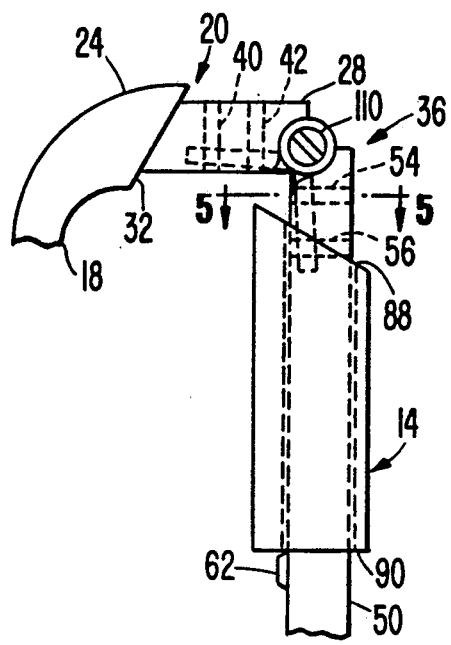
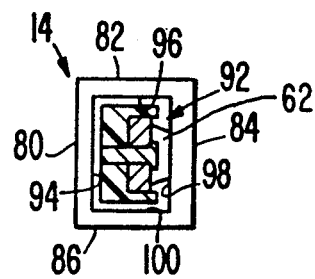
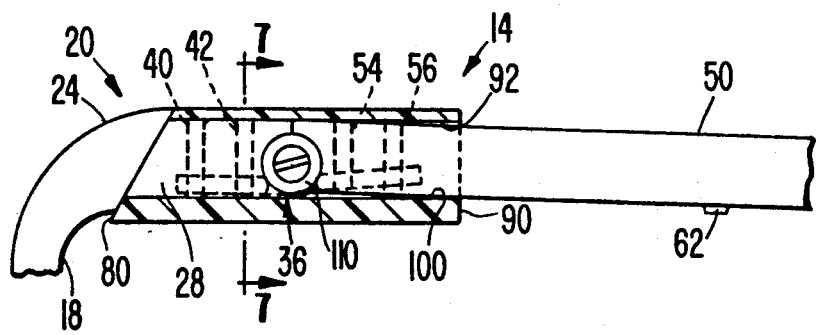
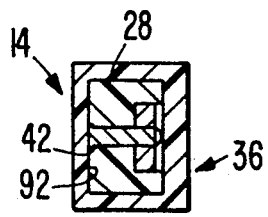

EYEGLASS FRAMES WITH REINFORCING TUBES

This is a continuation of application Ser. No. 07/324,453 filed Mar. 16, 1989 now abandoned.

FIELD OF THE INVENTION This invention relates to eyeglass frames with reinforcing tubes. More specifically, the invention relates to safety glasses made, for example, of cellulose acetate having reinforcing tubes made, for example, of polycarbonate, which are slidably coupled to the temple members for reinforcing their hinges.

BACKGROUND OF THE INVENTION

Typically, standard optical frame materials used throughout the world for safety glasses are cellulose acetate, propionate, nylon and buterate, which are structurally weak and deformable. These safety glasses have a tendency to break upon impact when the wearer is engaged in various sports activities, such as racquetball or basketball. The weakest part of these safety glasses is the hinge area. Prior art devices directed to reinforcing optical frames are typically bulky, complicated, and expensive. Thus, there is a need to reinforce safety glasses in an inexpensive and fashionable way.

This invention addresses this problem in the art, along with other needs which will become apparent to those skilled in the art once given this disclosure.

Examples of various prior art devices relating to eyeglass frames including reinforcements therefor are disclosed in United Kingdom patent 2,087,094 to Baldissarutti et al and U.S. Pat. Nos. 3,021,753 to Vinson; 3,846,017 to Ferrell; 3,762,805 to Lyons, Sr.; 4,222,640 to Bononi; 4,564,272 to Rinnooy Kan; 4,408,843 to Bononi; and 4,662,729 to Dobson.

SUMMARY OF THE INVENTION

Accordingly, a primary object of the invention is to provide eyeglass frames with reinforcing members at the hinge areas.

Another object of the invention is to provide a frame reinforcing member that is inexpensive to manufacture and easily replaced when broken.

Another object of the invention is to provide tubes for locking the temple members of eyeglass frames in their open positions.

Yet another object of the invention is to provide a reinforcing member that is slidably coupled to the temple members of the frames so that the frames may be folded when not in use.

A further object of the invention is to provide reinforced eyeglass frames that are simple to make, aesthetically pleasing, and not bulky.

The foregoing objects are basically attained by providing a reinforced eyeglass frame, the combination comprising: a frame front; first and second temple members; a first hinge, coupled to the frame front and the first temple member, for pivotally coupling the first temple member to the frame front between open and closed positions; a second hinge, coupled to the frame front and the second temple member, for pivotally coupling the second temple member to the frame front between open and closed positions; a first reinforcing member, coupled to the first temple member, for reinforcing and locking the first hinge in the open position; and a second reinforcing member, coupled to the second temple member, for reinforcing and locking the second hinge in the open position.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form part of this original disclosure:

FIG. 4 is an enlarged fragmentary top plan view of the eyeglass frame showing one of the hinge members in a folded, closed position and the reinforcing member in its retracted position;

FIG. 5 is a transverse cross-sectional elevational view of the temple member taken along line 5—5 in FIG. 4;

FIG. 6 is an enlarged fragmentary top plan view of the hinge member shown in FIG. 4 in its fully open position and with one of the reinforcing members covering the hinge; and FIG. 7 is a transverse cross-sectional elevational view of the temple member and reinforcing member taken along line 7—7 in FIG. 6.

DETAILED DESCRIPTION OF THE INVENTION

Figure 1:
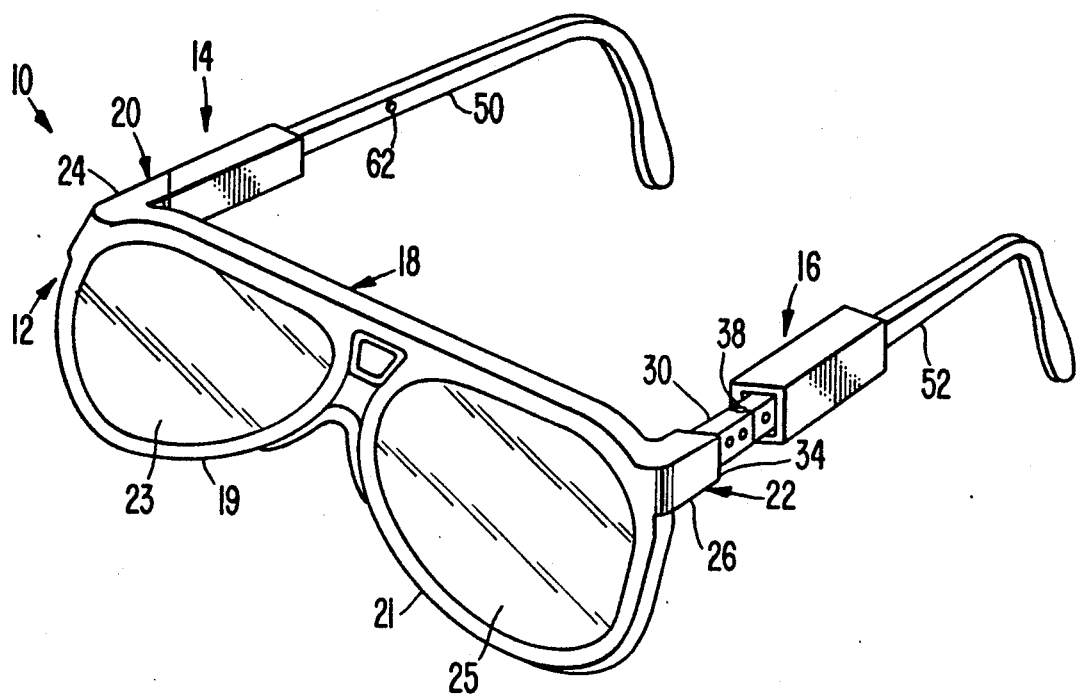
FIG. 1 is a left perspective view of an eyeglass frame having reinforcing members slidably coupled to each of the temple members in accordance with the present invention.
Figure 2:
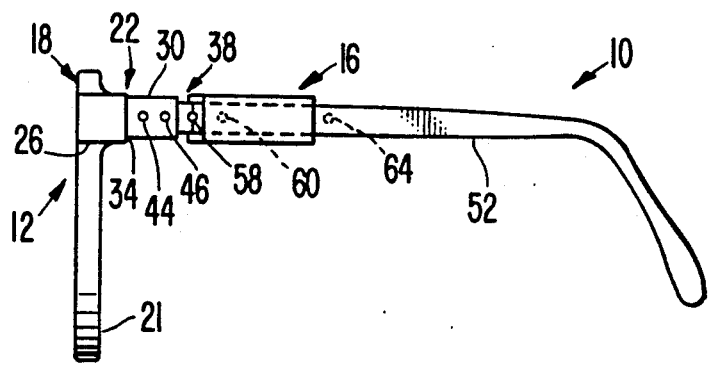
FIG. 2 is a side elevational view of the eyeglass frame and one of the reinforcing members shown in FIG. 1 in accordance with the present invention.

As seen in FIGS. 1 and 2, the eyeglass frame assembly 10 in accordance with the present invention comprises an eyeglass frame 12 and a pair of reinforcing members or tubes 14 and 16 slidably coupled thereto. Eyeglass frame 12 is made of polymeric material, preferably cellulose acetate, propionate, nylon or buterate; while the reinforcing members 14 and 16 are made of stronger and stiffer polymeric material, such as polycarbonate, preferably of the type sold under the trademark LEXAN.

The frame 12 includes a frame front 18 having a pair of rims 19 and 21 adapted to receive lenses 23 and 25 therein and a pair of rearwardly extending end posts 20 and 22 integrally attached thereto. In some instances, frame front 18 would have only one rim to receive only one lens therein or some other mechanism for coupling one or two lenses to the frame.

Since end posts 20 and 22 are mirror images, only end post 20 will be discussed in detail. End post 20 as seen in FIG. 4 includes a first portion 24 having a rectangular cross section and a second portion 28 having a rectangular cross section and extending rearwardly from the first portion 24 for about 0.475 inch. The first portion 24 is slightly tapered rearwardly from the frame front 18 to a transverse width of about 0.29 inch and a transverse height of about 0.36 inch. The second portion 28 is reduced in transverse width and height to about 0.20 inch and 0.30 inch, respectively, thereby forming a rearwardly facing, rectangular abutment surface 32 between the first and second portions 24 and 28. The abutment surface 32 limits the forward movement of reinforcing member 14 along temple member 50 and second portion 28. The abutment surface 32 extends outwardly about 0.06 inch on the interior side of second portion 28, about 0.03 inch on the exterior side of second portion 28, and about 0.03 inch on both the top and bottom sides of second portion 28. End post 22 as seen in FIGS. 1 and 2 includes similar structure comprising a first portion 26, a second portion 30 and an abutment surface 34. Abutment surfaces 32 and 34 are angled inwardly about 15° toward the lenses 23 and 25 in the frame front 18 as seen in FIGS. 1, 2, 4 and 6.

As seen in FIGS. 1 and 4, first and second hinge members 36 and 38 pivotally couple first and second temple members 50 and 52 to the frame front 18. First hinge member 36 is rigidly coupled at one end to end post second portion 28 by a set of rivets 40 and 42 and at its other end to temple member 50 by rivets 54 and 56. Similarly, second hinge member 38 is rigidly coupled at one end to the second portion of end post 22 by rivets 44 and 46 and at its other end to temple member 52 by rivets 58 and 60.

The temple members 50 and 52 each include a protruding stop member 62 and 64 for retaining the reinforcing members 14 and 16 thereon and preventing them from inadvertently falling off.

Figure 3:
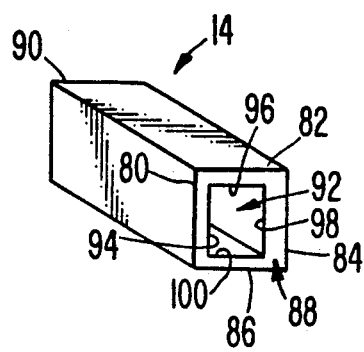
FIG. 3 is an enlarged, right perspective view of one of the reinforcing members shown in FIGS. 1 and 2.

The reinforcing members 14 and 16 are mirror images, so only reinforcing member 14 will be discussed in detail as seen in FIGS. 3 and 5. The reinforcing member 14 is a tube having a rectangular cross section with four planar walls 80, 82, 84 and 86, a front rectangular face 88 and a rear rectangular face 90. Wall 84 is thicker than the other walls 80, 82 and 86 for additional strength. The front face 88 is angled at about 15° with respect to the longitudinal axis of the reinforcing member 14 to flushly abut abutment surface 34 and to limit the forward movement of reinforcing member 14 along temple member 50 and second portion 28. A bore 92 extends longitudinally through reinforcing member 14 from the front face 88 to the rear face 90, and formed by the planar interior surfaces 94, 96, 98 and 100 oriented in a rectangular configuration. The interior surface of bore 92 slopes inwardly from front face 88 to rear face 90 at about 2° to facilitate its removal from its forming mold.

Referring now to FIGS. 4-7, the reinforcing member 14 is shown slidably received on temple member 50 to selectively engage second portion 28 on end post 20 and hinge member 38. In FIG. 4, reinforcing member 14 is shown in its first, or unlocked, position with its rear face 90 abutting against stop member 62. In this position, the hinge member 36 can pivot to fold up the temple members into a storage or closed position as shown. In this first position, the reinforcing member 14 is loosely slidably retained about the temple member 50, as seen in FIG. 5.

As seen in FIGS. 6 and 7, temple member 50 has been pivoted to an open position and reinforcing member 14 has been slid along temple member 50 to a second, or locking, position to overlie and surround a part of temple member 50, hinge member 36 and second portion 28. In this second position, the hinge member 36 is locked into its open position with reinforcing member 14 frictionally engaged with and retained about second portion 28 and hinge member 36. The bore 92 of reinforcing member 14 is sized and shaped to frictionally engage second portion 28 on end post 20 as seen in FIG. 7, and the outwardly protruding portion of hinge member 36 as seen in FIG. 6 to retain reinforcing member 14 in its second position.

The reinforcing member 14 is further retained in its second position because of the slight curvature formed by the second portion 28 of end post 20 and the temple member 50 across hinge member 36 as seen in FIG. 6. This curvature causes temple member 50 to press against interior surface 100 of reinforcing member 14, thus increasing the frictional forces between temple member 50 and reinforcing member 14.

Reinforcing member 16 is slidably coupled to engage temple member 52 and selectively engage second portion 30 on end post 22 and hinge member 38, in the same manner as reinforcing member 14, discussed above.

To replace a broken or damaged reinforcing member 14 or 16, the threaded fastener 110 of hinge member 36 or 38 is unthreaded for detaching temple member 50 or 52 from frame front 18. A new reinforcing member then can be slid over the temple member 50 or 52 and reattached to frame front 18 by threaded fastener 110.

While only one embodiment has been chosen to illustrate the invention, it will be understood by those skilled in the art that various changes and modifications can be made herein without departing from the scope of the invention as defined in the appended claims.

What is claimed is:

1. A reinforced eyeglass frame, the combination comprising:
    a frame front;
    first and second temple members;
    first hinge means, coupled to said frame front and said first temple member, for pivotally coupling said first temple member to said frame front between open and closed positions;
    second hinge means, coupled to said frame front and said second temple member, for pivotally coupling said second temple member to said frame front between open and closed positions;
    first reinforcing means, coupled to said first temple member, for reinforcing and locking said first hinge means in said open position, said first reinforcing means closely surrounding first portions of said first temple member and said frame front which are adjacent said first hinge means, thereby reinforcing said first hinge means and said first portions in said open position, said first reinforcing means being a stiff, non-elastic reinforcing tube; and
    second reinforcing means, coupled to said second temple member, for reinforcing and locking said second hinge means in said open position, said second reinforcing means closely surrounding second portions of said second temple member and said frame front which are adjacent said second hinge means, thereby reinforcing said second hinge means and said second portions in said open position, said second reinforcing means being a stiff, non-elastic, reinforcing tube.

2. A reinforced eyeglass frame according to claim 1, wherein
    each of said first and second reinforcing means comprises a tube slidably coupled to one of said temple members.

3. A reinforced eyeglass frame according to claim 1, wherein
    each of said first and second reinforcing means comprises means for surrounding said first and second hinge means when said first and second hinge means are in said open positions.

4. A reinforced eyeglass frame according to claim 1, wherein
    each of said first and second reinforcing means are made of polycarbonate.

5. A reinforced eyeglass frame according to claim 4, wherein
said frame front and said first and second temple members are made of cellulose acetate.

6. A reinforced eyeglass frame, the combination comprising:
a frame front;
first and second temple members;
first hinge means, coupled to said frame front and said first temple member, for pivotally coupling said first temple member to said frame front between open and closed positions;
second hinge means, coupled to said frame front and said second temple member, for pivotally coupling said second temple member to said frame front between open and closed positions;
first reinforcing means, coupled to said first temple member, for reinforcing and locking said first hinge means in said open position, said first reinforcing means closely surrounding first portions of said first temple member and said frame front which are adjacent said first hinge means, thereby reinforcing said first hinge means and said first portions in said open position, said first reinforcing means comprising means for surrounding said first hinge means when said first hinge means is in said open position; and
second reinforcing means, coupled to said second temple member, for reinforcing and locking said second hinge means in said open position, said second reinforcing means closely surrounding second portions of said second temple member and said frame front which are adjacent said second hinge means, thereby reinforcing said second hinge means and said second portions in said open position, said second reinforcing means comprising means for surrounding said second hinge means when said second hinge means is in said open position;
said frame front having first and second end posts extending rearwardly therefrom for frictionally engaging said first and second reinforcing means.

7. A reinforced eyeglass frame according to claim 6, wherein
each of said first and second end posts includes an abutment for engaging said first and second reinforcing means, respectively, to limit their forward movement.

8. A reinforced eyeglass frame, the combination comprising:
a frame front;
first and second temple members;
first hinge means, coupled to said frame front and said first temple member, for pivotally coupling said first temple member to said frame front between open and closed positions;
second hinge means, coupled to said frame front and said second temple member, for pivotally coupling said second temple member to said frame front between open and closed positions;
first reinforcing means, coupled to said first temple member, for reinforcing means and locking said first hinge means in said open positions; and
second reinforcing means, coupled to said second temple member, for reinforcing and locking said second hinge means in said open position,
each of said first and second reinforcing means comprising means for surrounding said first and second hinge means when said first and second hinge means are in said open positions,
each of said first and second temple members including means for retaining said first and second reinforcing means, respectively, thereon.

9. A reinforced eyeglass frame according to claim 8, wherein
each of said means for retaining includes a protrusion extending outwardly from each of said first and second temple members.

10. A reinforced eyeglass frame according to claim 9, wherein
each of said means for surrounding comprises a tube having an interior surface defining an axially extending bore therein.

11. A reinforced eyeglass frame according to claim 10, wherein
each of said bores of said first and second tubes has an interior surface oriented in a substantially rectangular configuration.

12. A reinforced eyeglass frame according to claim 10, wherein
each of said interior surfaces of said first and second tubes frictionally engages said first and second hinge means, respectively.

13. A reinforced eyeglass frame according to claim 10, wherein
each of said tubes is thicker along its inside portion.

14. A pair of reinforcing members for use in combination with an eyeglass frame having a frame front, first and second temple members, and first and second hinge members for pivotally coupling the first and second temple members to the frame front between open and closed positions, comprising:
first and second stiff, non-elastic reinforcing tubes, each of said first and second reinforcing tubes having an axially extending bore sized to be frictionally retained about the first and second hinge members when the first and second hinge members are in their open positions, said bores of said first and second reinforcing tubes being sized to closely surround, respectively, portions of the frame front and the first and second temple members which are adjacent the first and second hinge members, thereby reinforcing the portions of the frame front and the first and second temple members adjacent the first and second hinge members,
each of said bores of said first and second reinforcing tubes having an interior surface oriented in a rectangular configuration.

15. A pair of reinforcing members according to claim 14, wherein
said first and second reinforcing tubes are made of polycarbonate.

16. A pair of reinforcing members according to claim 14, wherein
each of said bores is sized to frictionally engage a portion of the first and second hinge members when in said open position.

17. A pair of reinforcing members according to claim 16, wherein
each of said first and second reinforcing tubes has four sidewalls forming an outer surface with a rectangular cross section.

18. A pair of reinforcing members according to claim 17, wherein
said first and second reinforcing tubes are thicker along one of their four sidewalls.

19. A pair of reinforcing members for use in combination with an eyeglass frame having a frame front, first and second temple members, and first and second hinge members for pivotally coupling the first end second temple members to the frame front between open and closed positions, comprising:

first and second reinforcing tubes, each of said first and second reinforcing tubes having an axially extending bore sized to be frictionally retained about the first and second hinge members when the first and second hinge members are in their open positions, said bores of said first and second reinforcing tubes being sized to closely surround, respectively, portions of the frame front and the first and second temple members which are adjacent the first and second hinge members, thereby reinforcing the portions of the frame front and the first and second temple members adjacent the first and second hinge members, each of said first and second reinforcing tubes having four sidewalls forming an outer surface with a rectangular cross section, an interior surface oriented in a rectangular configuration and sized to frictionally engage a portion of the first and second hinge members when in said open position, a front face and a rear face with said front face forming an obtuse angle with one of said sidewalls.

20. A reinforced eyeglass frame, the combination comprising:

a frame front;

first and second temple members;

first hinge means, coupled to said frame front and said first temple member, for pivotally coupling said first temple member to said frame front between open and closed positions;

second hinge means, coupled to said frame front and said second temple member, for pivotally coupling said second temple member to said frame front between open and closed positions;

a first stiff, non-elastic reinforcing tube slidable along said first temple member and said first hinge means between a first position spaced from said first hinge means and a second position closely surrounding said first hinge means and first portions of said first temple member and said frame front which are adjacent said first hinge means, thereby reinforcing said first hinge means and said first portions; and a second stiff, non-elastic reinforcing tube slidable along said second temple member and said second hinge means between a first position spaced from said second hinge means and a second position closely surrounding said second hinge means and second portions of said second temple member and said frame front which are adjacent said second hinge means, thereby reinforcing said second hinge means and said second portions.

21. A reinforced eyeglass frame according to claim 20, wherein said first reinforcing tube frictionally engages said first hinge means when said first reinforcing tube is in said second position; and said second reinforcing tube frictionally engages said second hinge means when said second reinforcing tube is in said second position.

22. A reinforced eyeglass frame, the combination comprising:

a frame front;

first and second temple members;

first hinge means, coupled to said frame front and said first temple member, for pivotally coupling said first temple member to said frame front between open and closed positions;

second hinge means, coupled to said frame front and said second temple member, for pivotally coupling said second temple member to said frame front between open and closed positions;

a first reinforcing tube slidable along said first temple member and said first hinge means between a first position spaced from said first hinge means and a second position surrounding and reinforcing said first hinge means; and a second reinforcing tube slidable along said second temple member and said second hinge means between a first position spaced from said second hinge means and a second position surrounding and reinforcing said second hinge means, said frame front comprising a first post frictionally receiving said first reinforcing tube when said first reinforcing tube is in said first position, and said frame front comprising a second post frictionally receiving said second reinforcing tube when said second reinforcing tube is in said second position.

23. A reinforced eyeglass frame, the combination comprising:

a frame front;

first and second temple members;

first hinge means, coupled to said frame front and said first temple member, for pivotally coupling said first temple member to said frame front between open and closed positions;

second hinge means, coupled to said frame front and said second temple member, for pivotally coupling said second temple member to said frame between open and closed positions;

a first reinforcing tube slidable along said first temple member and said first hinge means between a first position spaced from said first hinge means and a second position closely surrounding said first hinge means and first portions of said first temple member and said frame front which are adjacent said first hinge means, thereby reinforcing said first hinge means and said first portions;

a second reinforcing tube slidable along said second temple member and said second hinge means between a first position spaced from said second hinge means and a second position closely surrounding said second hinge means and second portions of said second temple member and said frame front which are adjacent said second hinge means, thereby reinforcing said second hinge means and said second portions;

first means, located one of said frame front and said first hinge means, for retaining said first reinforcing tube in said second position, and second means, located on one of said frame front and said second hinge means, for retaining said second reinforcing tube in said second position.

* * * * *